(12) United States Patent
Magne-Drisch et al.

(10) Patent No.: US 7,803,271 B2
(45) Date of Patent: Sep. 28, 2010

(54) METHOD OF EXTRACTING THE HYDROGEN SULFIDE CONTAINED IN A HYDROCARBON GAS

(75) Inventors: Julia Magne-Drisch, Villette de Vienne (FR); Anne-Claire Lucquin, Saint Maurice l'Exil (FR); Christina Streicher, Rueil Malmaison (FR); Jean Elgue, Lons (FR); Jean-Paul Cousin, Montigny les Cormeilles (FR); Gauthier Perdu, Suresnes (FR); Damien Roquet, Fontenay Sous Bois (FR); Viep Hoang Dinh, Bizanos (FR)

(73) Assignees: Institut Francais du Petrole, Cedex (FR); Total SA, Puteaux (FR)

( * ) Notice: Subject to any disclaimer, the term of this patent is extended or adjusted under 35 U.S.C. 154(b) by 903 days.

(21) Appl. No.: 11/671,650

(22) Filed: Feb. 6, 2007

(65) Prior Publication Data
US 2008/0187485 A1 Aug. 7, 2008

(30) Foreign Application Priority Data
Feb. 6, 2006 (FR) .................................. 06 01038

(51) Int. Cl.
*C10G 5/00* (2006.01)
(52) U.S. Cl. .................... 208/343; 208/344; 208/346; 585/860; 585/862; 585/857
(58) Field of Classification Search ................ 208/343, 208/344, 346; 585/860, 862, 857
See application file for complete search history.

(56) References Cited

U.S. PATENT DOCUMENTS

| | | | | |
|---|---|---|---|---|
| 3,205,164 A | * | 9/1965 | Brown | 208/236 |
| 3,473,903 A | * | 10/1969 | Dille et al. | 48/212 |
| 3,490,865 A | * | 1/1970 | Huxley | 423/229 |
| 3,656,887 A | * | 4/1972 | Suzuki et al. | 423/226 |
| 4,085,192 A | * | 4/1978 | Van Scoy | 95/179 |
| 5,133,954 A | * | 7/1992 | Ranke et al. | 423/573.1 |
| 6,368,385 B1 | * | 4/2002 | Paradowski | 95/181 |
| 6,508,863 B1 | * | 1/2003 | Byrne et al. | 95/143 |
| 6,610,124 B1 | * | 8/2003 | Dolan et al. | 95/98 |
| 7,373,790 B2 | * | 5/2008 | Clare et al. | 62/621 |

FOREIGN PATENT DOCUMENTS

| | | |
|---|---|---|
| EP | 0 021 479 A1 | 1/1981 |
| FR | 2 327 960 | 5/1977 |
| FR | 2 494 255 | 5/1982 |
| FR | 2 820 430 A1 | 8/2002 |

* cited by examiner

*Primary Examiner*—Tam M Nguyen
(74) *Attorney, Agent, or Firm*—Antonelli, Terry, Stout & Kraus, LLP.

(57) ABSTRACT

The invention provides a method of extracting the hydrogen sulfide contained in a gas comprising aromatic hydrocarbons, wherein the following stages are carried out:

a) contacting said gas with an absorbent solution so as to obtain a gas depleted in hydrogen sulfide and an absorbent solution laden with hydrogen sulfide, b) heating and expanding the hydrogen sulfide-laden absorbent solution to a predetermined temperature and pressure so as to release a gaseous fraction comprising aromatic hydrocarbons and to obtain an absorbent solution depleted in aromatic hydrocarbons, said temperature and pressure being so selected that said gaseous fraction comprises at least 50% of the aromatic hydrocarbons and at most 35% hydrogen sulfide contained in said hydrogen sulfide-laden absorbent solution, c) thermally regenerating the absorbent solution depleted in aromatic hydrocarbon compounds so as to release a hydrogen sulfide-rich gaseous effluent and to obtain a regenerated absorbent solution.

22 Claims, 6 Drawing Sheets

METHOD OF EXTRACTING THE HYDROGEN SULFIDE CONTAINED IN A HYDROCARBON GAS

FIELD OF THE INVENTION

The present invention relates to the sphere of deacidizing a hydrocarbon-containing gas, a natural gas for example.

BACKGROUND OF THE INVENTION

It is well known to use thermally regenerable liquid solvents for extracting the hydrogen sulfide contained in a gas, in particular in a natural gas. Examples of the most commonly used solvents are aqueous amine solutions and some physical solvents such as sulfolane, methanol, N-formyl morpholine, acetyl morpholine, propylene carbonate. Although many solvents likely to extract $H_2S$ also allow to extract $CO_2$, some of them however show a selectivity for $H_2S$ over $CO_2$ and are therefore used when the amount of $CO_2$ extracted with $H_2S$ is to be limited. Examples of the most commonly used $H_2S$ selective solvents are methyldiethanolamine (MDEA), diisopropanolamine (DIPA), as well as the sterically encumbered amines and some physical solvents such as, for example, dimethyl ether polyethylene glycol or N-methyl pyrrolidone.

These methods generally involve a stage of extraction of the $H_2S$ contained in the gas to be treated by contacting this gas with the regenerated solvent in an absorber operating at the pressure of the gas to be treated, followed by a thermal regeneration stage, generally at a pressure slightly higher than the atmospheric pressure, generally between 1 and 5 bara, preferably between 1.5 and 3 bara. This thermal regeneration is generally carried out in a column equipped in the bottom with a reboiler and at the top with a condenser allowing to cool the acid compounds released by the regeneration and to recycle the condensates to the top of the regenerator as reflux.

When the pressure of the gas to be treated is notably higher than the atmospheric pressure, for example in the case of a natural gas that has to be treated at a pressure of the order of 70 bar, the $H_2S$-rich solvent obtained at the absorber bottom can contain significant amounts of dissolved hydrocarbons. It is then common practice to carry out a stage of release of these dissolved hydrocarbons vaporized by simple expansion of the $H_2S$-rich solvent. This expansion is carried out at an intermediate pressure between that of the raw gas to be treated and that of the thermal regeneration stage, typically of the order of 5 to 15 bara. A gas containing the major part of the dissolved hydrocarbons, that can be used as fuel gas, is thus separated from the $H_2S$-rich solvent. This gas is sometimes washed by a stream of regenerated solvent coming from the thermal stage so as to re-absorb the acid compounds, notably the $H_2S$ released upon expansion. This washing of the fuel gas released by expansion is generally performed in a column placed directly on the separator drum between the gas and the expanded liquid. The solvent thus laden with $H_2S$ is directly mixed with the expanded solvent and sent to the thermal regeneration stage.

In order to reduce the heat consumptions of these methods, a stage of thermal exchange between the rich solvent after expansion and the regenerated solvent obtained hot at the bottom of the regeneration column is generally carried out.

Regeneration of these solvents produces a gaseous effluent rich in acid compounds, essentially containing the extracted $H_2S$ and $CO_2$. This acid effluent is generally subjected to a treatment in order to convert the $H_2S$ to elementary sulfur, non-toxic and easy to transport. The most commonly used conversion method is the Claus process, notably described in documents FR-2,494,255 and FR-2,327,960, wherein the acid gas extracted undergoes partial combustion in air or oxygen-enriched air generating a stoichiometric mixture of $H_2S$ and $CO_2$ and of the elementary sulfur, recovered by condensation. This first thermal stage is generally followed by one to three catalytic conversion stages during which the $H_2S$ and the $CO_2$ react and form elementary sulfur according to the Claus reaction:

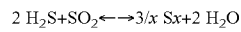

$$2\,H_2S + SO_2 \leftrightarrow 3/x\,S_x + 2\,H_2O$$

After the catalytic stages of the Claus process, a gas still containing notable amounts of sulfur products ($SO_2$, $H_2S$, as well as COS, $CS_2$ and elementary sulfur) is obtained. In order to limit discharge of these compounds into the environment, this type of gas is generally subjected to a complementary finishing treatment. Various technologies have been proposed and used to carry out this type of finishing treatment. One of the most commonly used methods consists in converting all of the sulfur compounds of this gas to $H_2S$, by reaction with reducing gases (hydrogen, CO) in the presence of a suitable catalyst. The residue gas thus obtained after this catalytic reduction stage is then washed by a solvent allowing selective extraction of the $H_2S$ and, after regeneration of this solvent, recycling of the $H_2S$ thus extracted to the thermal stage of the Claus plant.

It is possible to use a selective solvent, for example an aqueous MDEA solution, for washing the residue gas from the catalytic reduction stage downstream from the Claus plant.

When the raw gas to be treated is a natural gas containing $CO_2$ and notable amounts of aromatic hydrocarbons (for example some hundred ppmv), notable amounts of these compounds are found in admixture with the $H_2S$ in the acid gas. In fact, although the stage of expansion of the $H_2S$-rich solvent obtained at the bottom of the absorber allows to release the major part of the light hydrocarbons (methane, ethane, . . . ) dissolved in the solvent at the absorber bottom, it does not allow to extract the major part of the heavier compounds, in particular the aromatic compounds whose solubility in solvents is generally much higher than that of the aliphatic hydrocarbons. An acid gas that can contain several hundred ppmv of aromatic hydrocarbons is then commonly obtained at the regenerator top. Besides, even with solvents allowing selective absorption of $H_2S$ over $CO_2$, a certain $CO_2$ co-absorption is always observed. When the raw gas to be treated contains more $CO_2$ than $H_2S$, this co-absorption can lead to an acid gas containing large or even major proportions of $CO_2$.

The simultaneous presence of large amounts of $CO_2$ and of notable proportions (some hundred ppmv) of aromatic hydrocarbons in an acid gas leads to certain difficulties for conversion of the $H_2S$ of this gas to sulfur by means of the Claus process. In fact, dilution of $H_2S$ by $CO_2$ reduces the temperature obtained in the oven of the Claus thermal stage. This temperature reduction in turn decreases the destruction of the aromatic compounds, which are then present in notable proportions in the subsequent catalytic stages. The presence of these aromatic compounds during these catalytic stages can then cause various operating problems such as: production of coloured sulfur contaminated by carbon-containing compounds and therefore unfit for sale, clogging and activity loss of the catalysts by formation and deposition of carbon-containing compounds on the catalysts (carsuls).

Furthermore, when dilution of the $H_2S$ in the gaseous effluent produced during regeneration becomes too high, it is no longer possible to have a thermal stage in the Claus process. One may then consider treating highly diluted gases (containing only some % by volume of $H_2S$) by means of direct oxidation processes wherein the acid gas and the air are directly contacted in the presence of a suitable catalyst allowing the reaction between the $H_2S$ and the oxygen of the air to be controlled so as to essentially produce only sulfur, but then again the presence of a large proportion of aromatic hydrocarbons makes it difficult to use these catalysts.

Various solutions have been proposed to overcome these drawbacks, among which:

preheating the gases (acid gas and air) feeding the burner of the thermal stage of the Claus process. Such a preheating operation allows the temperature to be increased in the oven of the Claus plant. Depending on the $CO_2$ content of the gas, this solution does however not always allow to reach the temperature levels required to obtain nearly-total destruction of the aromatic hydrocarbons (of the order of 1150° C. or more), unless expensive preheating methods are implemented, absorption of the aromatic compounds present in the acid gas on a suitable material (activated charcoal for example). This method requires an additional processing unit that may be expensive as regards investment (case of a regenerable adsorbent) or operating costs (case of non-regenerable adsorbents), acid gas enrichment by selective re-absorption of the $H_2S$ it contains in a suitable solvent. This method is very efficient as regards sulfur production since it allows to obtain, on the one hand, an $H_2S$-depleted gas containing most of the $CO_2$ and of the aromatic hydrocarbons present in the acid and, on the other hand, an $H_2S$-concentrated gas depleted in aromatic hydrocarbons. It however represents a significant investment since all of the $H_2S$ extracted from the raw gas to be treated has to be re-absorbed.

The present invention provides a simple and inexpensive method that requires only a small number of additional equipments for separating the major part of the aromatic hydrocarbons co-absorbed by the solvent from the major part of the hydrogen sulfide absorbed by the solvent.

SUMMARY OF THE INVENTION

In general terms, the present invention relates to a method of extracting the hydrogen sulfide contained in a gas comprising aromatic hydrocarbons, wherein the following stages are carried out:

a) contacting said gas with an absorbent solution so as to obtain a gas depleted in hydrogen sulfide and an absorbent solution laden with hydrogen sulfide, b) heating and expanding the hydrogen sulfide-laden absorbent solution to a predetermined temperature and pressure so as to release a gaseous fraction comprising aromatic hydrocarbons and to obtain an absorbent solution depleted in aromatic hydrocarbons, said temperature and said pressure being so selected that said gaseous fraction comprises at least 50% of the aromatic hydrocarbons contained in said hydrogen sulfide-laden absorbent solution and at most 35% hydrogen sulfide contained in said hydrogen sulfide-laden absorbent solution, (the gaseous fraction released following the expansion comprises a ratio of $CO_2$ content to $H_2S$ content greater than the ratio of $CO_2$ content to the $H_2S$ content of the absorbent solution before the expansion), c) thermally regenerating the absorbent solution depleted in aromatic hydrocarbon compounds so as to release a hydrogen sulfide-rich gaseous effluent and to obtain a regenerated absorbent solution. Thermal regeneration can be achieved by distillation or steam stripping of the acid compounds.

According to the invention, at least part of the regenerated absorbent solution obtained in stage c) can be recycled to stage a) as absorbent solution.

Furthermore, at least part of the hydrogen sulfide-rich gaseous effluent obtained in stage c) can be treated by a Claus process.

The gaseous fraction comprising aromatic compounds obtained in stage b) can be sent to a burner of said Claus process.

The gaseous fraction comprising aromatic hydrocarbons obtained in stage b) as well as tail gas from said Claus process can be contacted with a second absorbent solution so as to produce a hydrogen sulfide-poor stream and a second absorbent solution enriched in hydrogen sulfide. At least part of the second hydrogen sulfide-enriched absorbent solution can be recycled to stage a) as absorbent solution.

Stage c) can be carried out in a regeneration column and at least part of the second hydrogen sulfide-enriched absorbent solution can be fed into said column so as to be regenerated.

The gaseous fraction comprising aromatic hydrocarbons obtained in stage b) can be contacted with a portion of the regenerated absorbent solution obtained in stage c) so as to obtain a hydrogen sulfide-depleted gaseous fraction and a third hydrogen sulfide-enriched absorbent solution.

The gaseous fraction comprising aromatic hydrocarbons obtained in stage b) can first be cooled and condensed prior to being contacted with the portion of the regenerated absorbent solution obtained in stage c).

The hydrogen sulfide-rich gaseous effluent obtained in stage c) can be treated by means of a hydrogen sulfide oxidation process.

Prior to stage c), the aromatic hydrocarbon-depleted absorbent solution can be contacted with a fraction of the hydrogen sulfide-rich gaseous effluent obtained in stage c) so that said fraction carries along part of the aromatic hydrocarbons contained in said solution.

Alternatively, the hydrogen sulfide-rich gaseous effluent obtained in stage c) can be partly condensed by cooling so as to produce a gas phase and a condensate and, prior to stage c), the aromatic hydrocarbon-depleted absorbent solution can be contacted with a fraction of said gas phase so that said fraction carries along part of the aromatic hydrocarbons and of the carbon dioxide contained in said solution.

Alternatively or as a complement to the aforementioned gaseous fraction recycles, part of the regenerated absorbent solution obtained in stage c) can be recycled hot, directly from the regenerator outlet, to stage b) as absorbent solution: the gaseous fraction released in stage b) is contacted with part of the regenerated absorbent solution obtained in stage c). The gaseous fraction released in stage b), comprising aromatic hydrocarbons and hydrogen sulfide, is thus depleted in hydrogen sulfide without any additional equipment and the absorbent solution from stage b) is accordingly enriched in hydrogen sulfide. This recycling of part of the hot regenerated absorbent solution furthermore leads to better thermal integration of the process.

The absorbent solution can comprise an amine in solution in water. The amine can be selected from among the group comprising methyldiethanolamine, diisopropanolamine and the sterically encumbered amines and, in stage b), said temperature can range between 80° C. and 140° C. and said pressure can range between 1.5 and 6 bara. The amine can also be selected from among the group comprising monoethanolamine and diethanolamine and, in stage b), said temperature can range between 80° C. and 140° C. and said pressure can range between 1.5 and 6 bara.

Alternatively, the absorbent solution can be selected from among the group made up of sulfolane, methanol, N-formyl morpholine, acetyl morpholine, propylene carbonate, dimethyl ether polyethylene glycol or N-methyl pyrrolidone.

According to the invention, the gas can be a natural gas. The gas can comprise at least 50 ppmv of aromatic hydrocarbons.

In the method according to the invention, implementation of this method is favoured by the fact that the proportion of aromatic hydrocarbons sent to the Claus process is limited.

When a solvent with selective $H_2S$ absorption over $CO_2$ is used, the method according to the invention also allows to obtain a substantial increase in the $H_2S$ concentration of the acid gas, again at a low cost, notably without having to re-absorb all or even a great fraction of the $H_2S$ extracted from the raw gas. This effect also contributes to improving operation of the Claus process.

BRIEF DESCRIPTION OF THE FIGURES

Other features and advantages of the invention will be clear from reading the description hereafter, with reference to the accompanying figures wherein.

DETAILED DESCRIPTION

Figure 1:
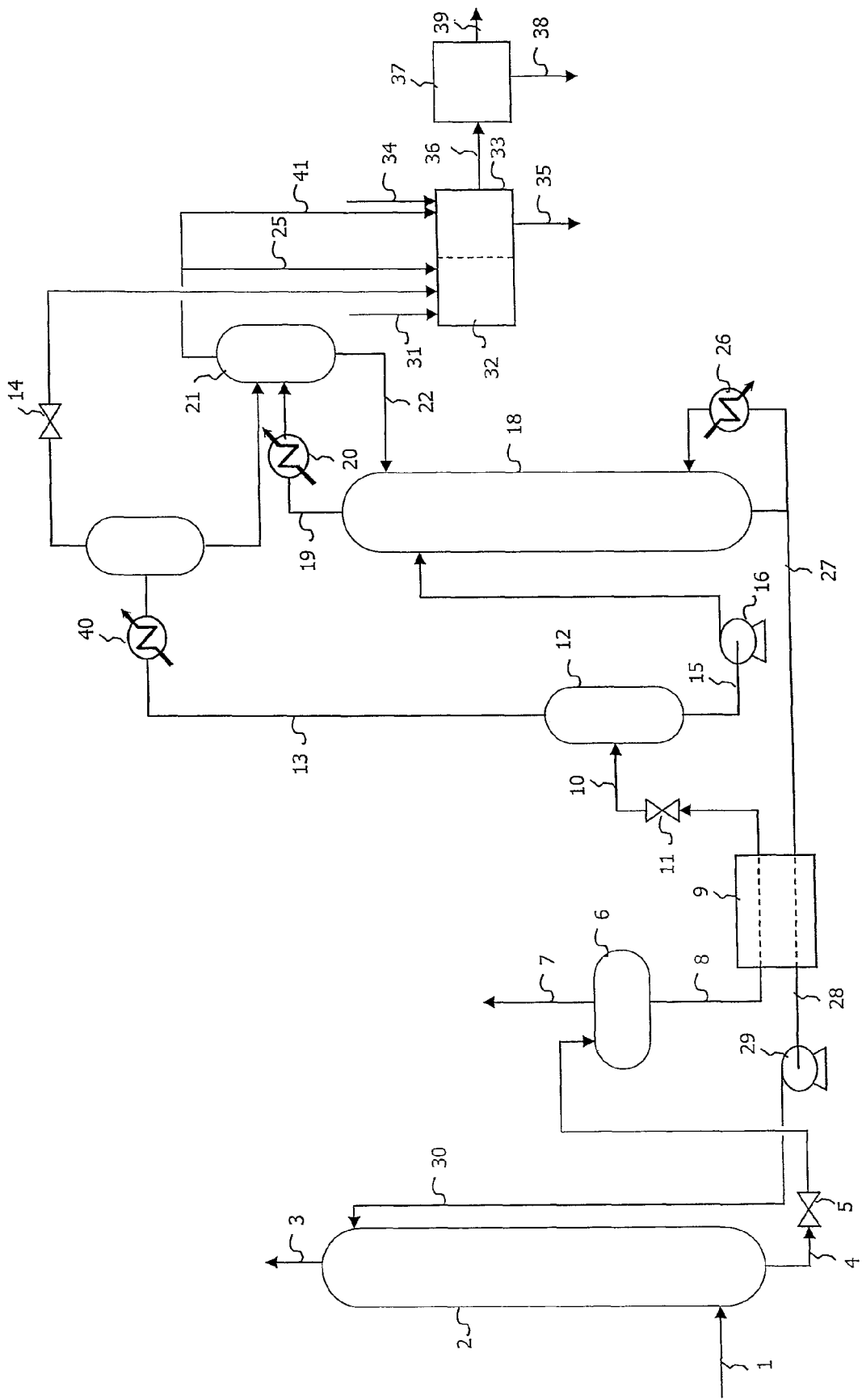
FIG. 1 diagrammatically shows an embodiment of the method according to the invention, FIGS. 1b, 2, 2b, 3 and 3b diagrammatically show embodiment variants of the method according to the invention.
Figure 1B:
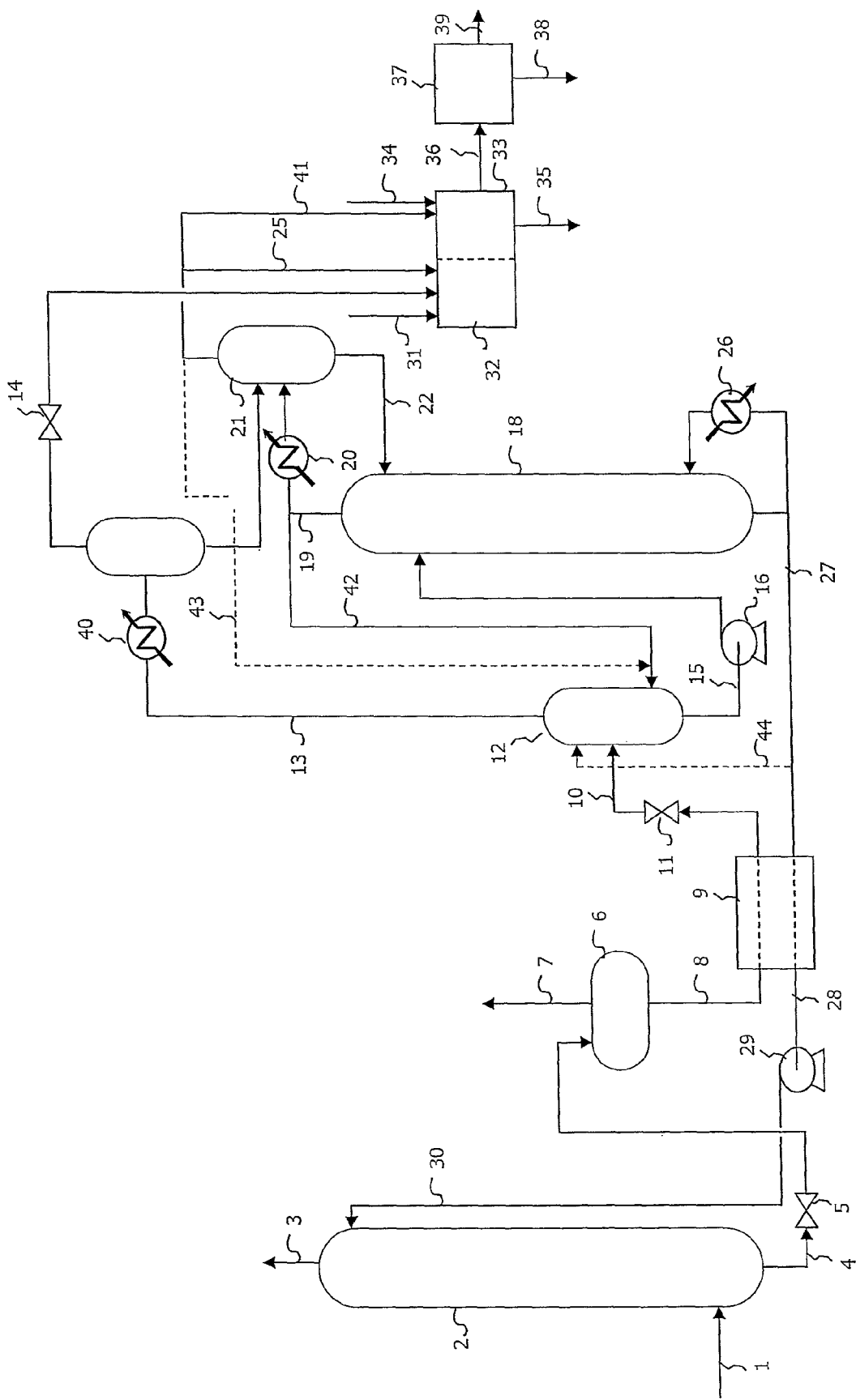

In connection with FIGS. 1 and 1b, the gas to be treated flows through line 1 into the bottom of an absorber 2. The gas from which the $H_2S$ absorbed by the solvent injected at the absorber top through line 30 and the fractions of the co-absorbed compounds, notably the hydrocarbons and the $CO_2$, are extracted is recovered at the top of absorber 2. This absorber generally operates at temperatures close to or slightly higher than the ambient temperature, typically ranging between 20° C. and 100° C., preferably between 30° C. and 90° C., and at pressures typically ranging between 10 and 200 bar, preferably between 20 and 100 bar.

The solvent used in the method according to the invention is selected for its $H_2S$ absorption capacity. The method can notably be implemented when the solvent used is an aqueous solution of an amine or of a mixture of amines such as monoethanolamine, diethanolamine, diisopropanolamine, the sterically encumbered amines, a physical solvent such as sulfolane, methanol, N-formyl morpholine, acetyl morpholine, dimethyl ether polyethylene glycol, N-methyl pyrrolidone, propylene carbonate or a mixture of amines, of physical solvent and of water in variable proportions. The method according to the invention can be carried out with an $H_2S$ selective or non-selective solvent over $CO_2$.

The gas flowing in through line 1 can be a natural gas available at a pressure ranging between 10 and 200 bar, and at a temperature ranging between 20° C. and 100° C. This gas comprises $H_2S$ and possibly other acid compounds such as $CO_2$, COS, mercaptans. Furthermore, the natural gas comprises aromatic hydrocarbons, which are unsaturated cyclic compounds comprising an aromatic ring such as benzene, toluene or xylenes.

In FIGS. 1 and 1b, the $H_2S$-rich solvent obtained at the bottom of the absorber through line 4 is expanded by an expansion means 5 and fed into a first flash drum 6. This first expansion stage is optional for implementing the method according to the invention, but it allows to obtain, through line 7, a gas containing the major part of the aliphatic hydrocarbons co-absorbed by the solvent. This gas is possibly washed by a fraction of the regenerated solvent and the gas thus obtained can be used as fuel gas. This washing procedure, which is optional, is not shown here. Flash drum 6 operates at a pressure that is lower than that of absorber 2 and higher than that of flash drum 12. This pressure generally depends on the conditions of use of the fuel gas and it is typically of the order of 5 to 15 bara. This drum operates at a temperature that is substantially identical to that of the solvent obtained at the bottom of absorber 2.

The $H_2S$-rich solvent obtained after expansion is sent through line 8 to a preheating means. FIGS. 1 and 1b show a heat exchanger 9 with the regenerated solvent obtained at the bottom of regeneration column 18, but any other suitable preheating means can be used, provided that it allows the temperature of the $H_2S$-rich solvent to be brought to the level required for partial vaporization of the compounds absorbed by the $H_2S$-rich solvent.

The preheated $H_2S$-rich solvent is fed through line 10, after possible expansion by means of an expansion means 11, into drum 12 where the vaporized gases and the $H_2S$-rich solvent are separated. This drum 12 is operated under such temperature and pressure conditions that vaporization of a minor fraction of the $H_2S$ absorbed by the solvent, generally below 35%, preferably below 30%, and of a major fraction of the aromatic hydrocarbons absorbed by the solvent, above 50%, preferably above 70%, is obtained. The pressure of drum 12 is lower than that of drum 6 and higher than the atmospheric pressure, preferably ranging between 2 and 6 bara. The temperature of drum 12 ranges between that of the $H_2S$-laden solvent obtained at the bottom of absorber 2 and that of the regenerated solvent obtained at the bottom of regenerator 18.

It is also possible to recycle a minor fraction of the acid gas obtained at the top of reflux drum 21 or to use any other gas stream that would be available as stripping agent, injected into the bottom of drum 12, so as to increase the proportion of aromatic hydrocarbons vaporized during this stage. Besides, alternatively or as a complement to the acid gas recycle, it is also possible to recycle a fraction of hot regenerated absorbent solution obtained at the bottom of regenerator 18 to the top of drum 12 so as to wash the vaporized gases and thus to concentrate the hydrogen sulfide in the absorbent solution sent to regeneration column 18.

FIG. 1b completes the method described in reference to FIG. 1 by diagrammatically showing two embodiments of the recycle of the acid gas obtained in regenerator 18 to drum 12 and an embodiment of the recycle of the hot regenerated absorbent solution obtained at the bottom of regenerator 18 to drum 12.

In FIG. 1b, a fraction of the acid gas obtained directly at the outlet of regenerator 18 through line 42 or obtained at the top of reflux drum 21 through line 43 is injected into the bottom of drum 12. This recycling of a fraction of the acid gas, ranging between 0 and 80% by volume of the total stream, preferably between 0 and 50% and more preferably between 10 and 35% of the total stream, allows to increase the proportion of aromatic hydrocarbons vaporized during this stage and to enrich in $H_2S$ said acid gas from regenerator 18, and therefore to improve the operation of the plant intended for conversion of the $H_2S$ to sulfur by means of the Claus process. This $H_2S$ enrichment of the acid gas at the outlet of regenerator 18 is explained by the amount of $CO_2$ discharged through line 13 that is notably improved, which causes an increase of concentration of the residual $H_2S$ in the solvent obtained at the bottom of drum 12 and sent through line 15 and pump 16 to the top of regenerator 18, and therefore an increase of concentration of the $H_2S$ in the acid gas released at the top of regenerator 18 to the Claus plant through lines 25 and 41.

In FIG. 1b, a fraction of hot regenerated absorbent solution obtained at the bottom of regenerator 18 through line 27 is injected via line 44 to the top of drum 12. In drum 12, the hot regenerated absorbent solution is contacted with the gas released by the expansion of the acid compound-laden absorbent solution flowing in through line 11 and possibly with the stripping gases fed into 12 through line 42 and/or 43. This recycling of a fraction of hot regenerated absorbent solution ranging between 0 and 50% by volume of the total stream, preferably between 5 and 35% by volume of the total stream, allows to wash, without any additional equipment, the gaseous fraction from drum 12 and thus to deplete this gaseous fraction in hydrogen sulfide, therefore to enrich the absorbent solution in hydrogen sulfide. The absorbent solution thus enriched in hydrogen sulfide allows to produce an acid gas that is accordingly richer in $H_2S$ at the outlet of regenerator 18.

In FIGS. 1 and 1b, the solvent obtained at the bottom of drum 12 is sent through line 15 and pump 16 to the top of regenerator 18. In this regenerator, the acid compounds absorbed by the solvent, notably $H_2S$, are vaporized by stripping effect with steam generated by reboiler 26 at the regenerator bottom. These gases are collected through line 19 at the regenerator top, cooled in exchanger 20, and the majority of the water and of the solvent contained in the regenerator top gas is condensed, separated in reflux drum 21 and recycled as reflux to the regenerator top through line 22. The operating temperature and pressure conditions of the regenerator depend on the type of solvent used. Regenerator 18 operates at a pressure generally ranging between the atmospheric pressure and 10 bara, preferably between 1.5 and 3 bara. The temperature at the bottom of the regenerator generally ranges between 100° C. and 200° C., preferably between 110° C. and 150° C.

At the bottom of regenerator 18, a stream of hot regenerated solvent is obtained through line 27 and recycled via line 28, pump 29 and line 30 to the top of absorber 2 after heat exchange with the $H_2S$-rich solvent in exchanger 9.

The gases released by partial vaporization in drum 12 are fed through line 13, possibly after condensation of the water in condenser 40 and possibly after expansion by an expansion means 14, into a first section 32 of the thermal stage of a plant implementing the Claus process. The gases obtained after expansion in means 14 can be mixed with a fraction of the acid gas obtained at the top of reflux drum 21 through line 25. This acid gas fraction from reflux drum 21 is possibly introduced so as to adjust the overall composition of the gas in thermal section 32. In this section, these gases rich in aromatic hydrocarbons, possibly mixed with an acid gas fraction, are subjected to combustion in air or oxygen-enriched air supplied through line 31. This combustion is carried out by means of suitable instruments (burner, oven, ...), not shown here, and the air flow rate is so determined as to obtain a temperature allowing nearly-total destruction of the aromatic hydrocarbons. This temperature must be above 1150° C., preferably above 1200° C.

The hot gaseous mixture thus obtained is then fed into a second combustion section 33 where it is mixed with the acid gas obtained at the top of reflux drum 21 through line 41, with a proportion of air or of oxygen-enriched air supplied through line 34, determined in such a way as to obtain at the outlet of the thermal stage, through line 36, a gaseous mixture containing a stoichiometric $H_2S/SO_2$ ratio ($H_2S/SO_2=2$). The air or the oxygen-enriched air and the acid gas are fed into this second combustion section through suitable means that are not shown here (burners, injection pipes, ...). Determination of the flow rate of air or of oxygen-enriched air injected into this second section so as to control the reaction stoichiometry is performed by the means commonly used in this type of plant, not shown here (on-line analyzer of the acid gas at the Claus plant outlet acting on a makeup air or oxygen-enriched air control valve). The reaction in the section is not disturbed by the presence of aromatic hydrocarbons because they have been separated in drum 12 and destroyed in section 32.

After these combustion stages, the gas is cooled so as to produce liquid elementary sulfur through line 35 and a gas that is fed through line 36 into catalytic section 37 of the Claus plant, this section producing liquid sulfur through line 38 and a residue gas through line 39, that can be possibly subjected to additional treatments.

In the second embodiment of the invention described in connection with FIGS. 2 and 2b, the gas to be treated is fed through line 1 into the bottom of an absorber 2. The gas from which the $H_2S$ absorbed by the solvent injected at the absorber top through line 30 and the fractions of the co-absorbed compounds, notably the hydrocarbons and the $CO_2$, are extracted is recovered at the top of absorber 2. This absorber generally operates at temperatures close to or slightly higher than the ambient temperature, typically ranging between 20° C. and 100° C., preferably between 30° C. and 90° C., and at pressures typically ranging between 10 and 200 bar, preferably between 20 and 100 bar.

The $H_2S$-rich solvent obtained at the bottom of the absorber through line 4 is expanded by an expansion means 5 and fed into a first flash drum 6. This first expansion stage is optional for implementing the method according to the invention, but it allows to obtain, through line 7, a gas containing the major part of the aliphatic hydrocarbons co-absorbed by the solvent. This gas is possibly washed by a fraction of the regenerated solvent and the gas thus obtained can be used as fuel gas. This washing procedure, which is optional, is not shown here. Flash drum 6 operates at a pressure that is lower than that of absorber 2 and higher than that of flash drum 12. This pressure generally depends on the conditions of use of the fuel gas and it is typically of the order of 5 to 15 bara. This drum operates at a temperature that is substantially identical to that of the solvent obtained at the bottom of absorber 2.

The $H_2S$-rich solvent obtained after expansion is sent through line 8 to a preheating means. FIGS. 2 and 2b show a heat exchanger 9 with the regenerated solvent obtained at the bottom of regeneration column 21, but any other suitable preheating means can be used, provided that it allows the temperature of the $H_2S$-rich solvent to be brought to the level required for partial vaporization of the compounds absorbed by the $H_2S$-rich solvent.

The preheated $H_2S$-rich solvent is fed through line 11, after possible expansion by means of an expansion means 10, into drum 12 where the vaporized gases and the $H_2S$-rich solvent are separated. This drum 12 is operated under such temperature and pressure conditions that vaporization of a minor fraction of the $H_2S$ absorbed by the solvent, generally below 35%, preferably below 30%, and of a major fraction of the aromatic hydrocarbons absorbed by the solvent, above 50%, preferably above 70%, is obtained. These aromatic hydrocarbons can be benzene, toluene or xylenes. The pressure of drum 12 is lower than that of drum 6 and higher than the atmospheric pressure, preferably ranging between 2 and 6 bara. The temperature of drum 12 ranges between that of the $H_2S$-laden solvent obtained at the bottom of absorber 2 and that of the regenerated solvent obtained at the bottom of regenerator 21.

It is also possible to recycle a minor fraction of the acid gas obtained at the top of reflux drum 24 or to use any other gas stream that would be available as stripping agent, injected into the bottom of drum 12, so as to increase the proportion of aromatic hydrocarbons vaporized during this stage.

Besides, alternatively or as a complement to the acid gas recycle, it is also possible to recycle a fraction of hot regenerated absorbent solution obtained at the bottom of regenerator 21 to the top of drum 12 so as to wash the vaporized gases and thus to concentrate the hydrogen sulfide in the absorbent solution sent to regeneration column 21.

Figure 2:
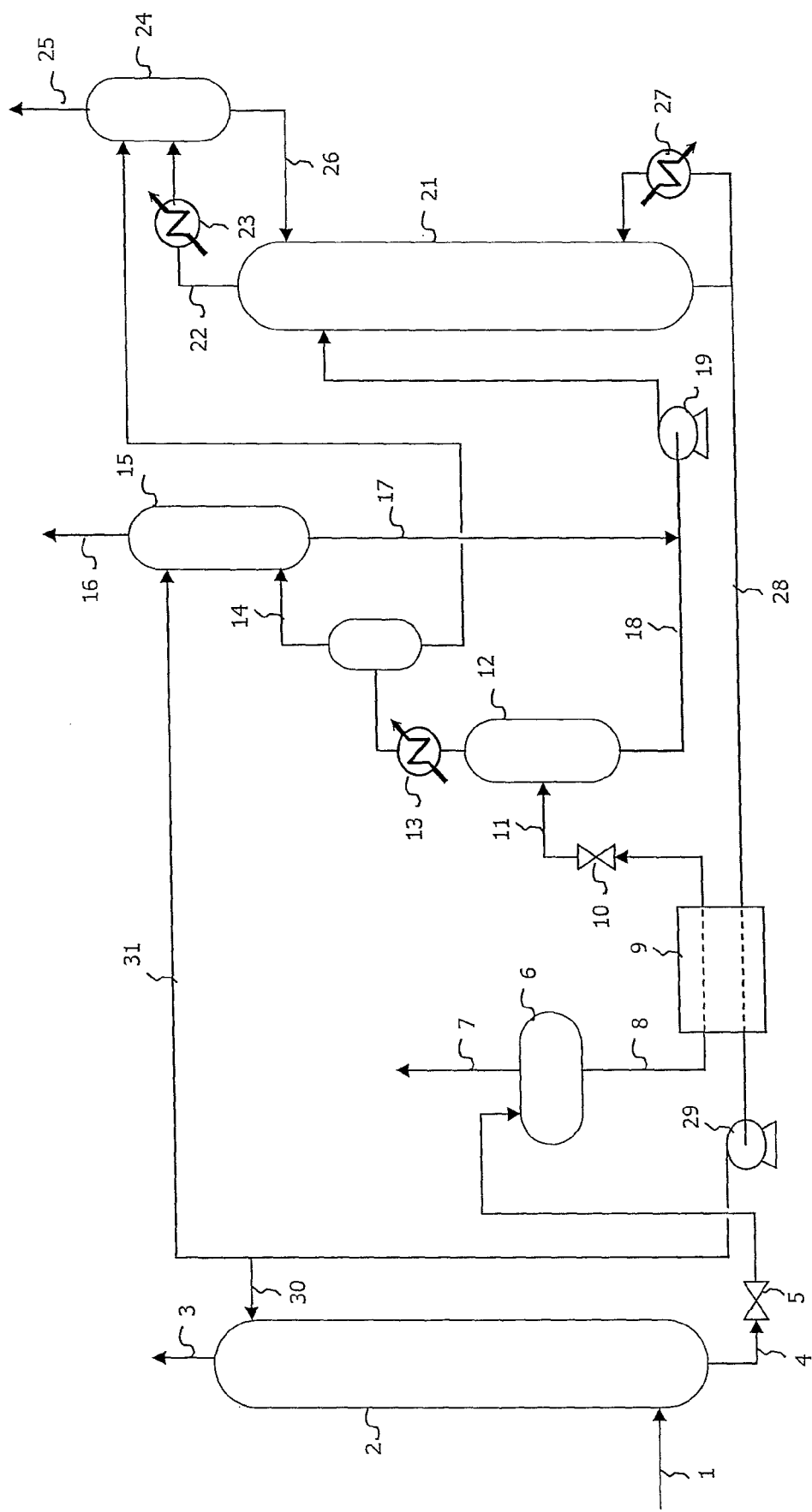
Figure 2B:
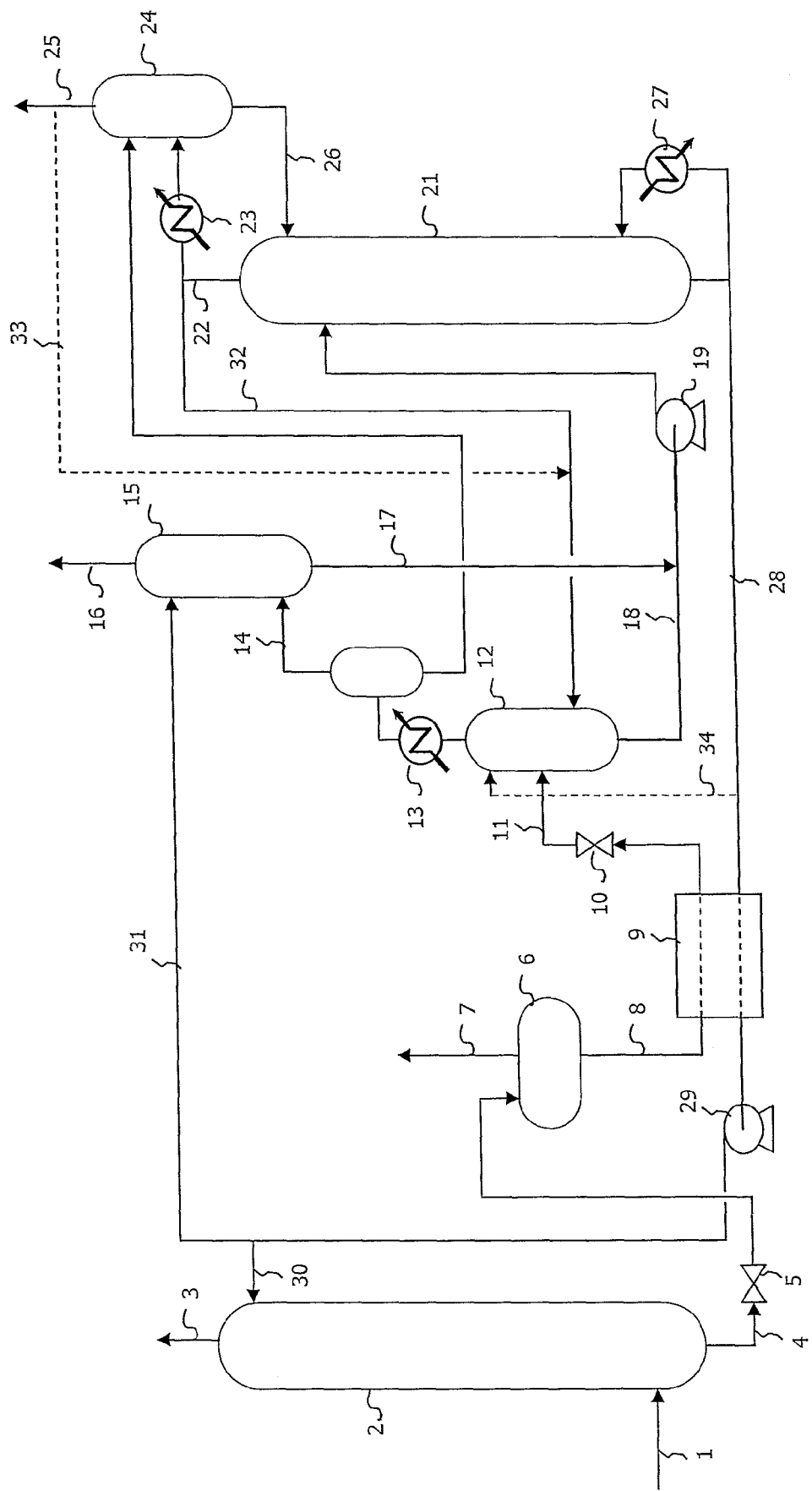

FIG. 2b completes the method described in reference to FIG. 2 by diagrammatically showing two embodiments of the recycle of the acid gas obtained in regenerator 21 to drum 12 and an embodiment of the recycle of the hot regenerated absorbent solution obtained at the bottom of regenerator 21 to drum 12.

In FIG. 2b, a fraction of the acid gas obtained directly at the outlet of regenerator 21 through line 32 or obtained at the top of reflux drum 24 through line 33 is injected into the bottom of drum 12. This recycling of a fraction of the acid gas, ranging between 0 and 80% by volume of the total stream, preferably between 0 and 50% and more preferably between 10 and 35% of the total stream, allows to increase the proportion of aromatic hydrocarbons vaporized during this stage and to enrich in $H_2S$ said acid gas from regenerator 21. This $H_2S$ enrichment of the acid gas at the outlet of regenerator 21 is explained by the amount of $CO_2$ discharged at the top of drum 12, that is notably improved, which causes an increase of concentration of the residual $H_2S$ in the solvent obtained at the bottom of drum 12 and sent through line 18 and pump 19 to the top of regenerator 21, and therefore an increase of concentration of the $H_2S$ in the acid gas released at the top of regenerator 21 discharged through line 25.

In FIG. 2b, a fraction of hot regenerated absorbent solution obtained at the bottom of regenerator 21 through line 28 is injected via line 34 to the top of drum 12. In drum 12, the hot regenerated absorbent solution is contacted with the gas released by the expansion of the acid compound-laden absorbent solution flowing in through line 11 and possibly with the stripping gases fed into 12 through line 32 and/or 33. This recycling of a fraction of hot regenerated absorbent solution ranging between 0 and 50% by volume of the total stream, preferably between 5 and 35% by volume of the total stream, allows to wash, without any additional equipment, the gaseous fraction from drum 12 and thus to deplete this gaseous fraction in hydrogen sulfide, therefore to enrich the absorbent solution in hydrogen sulfide. The absorbent solution thus enriched in hydrogen sulfide allows to produce an acid gas that is accordingly richer in $H_2S$ at the outlet of regenerator 21.

In reference to FIGS. 2 and 2b, the solvent obtained at the bottom of drum 12 is sent through line 18 and pump 19 to the top of regenerator 21. In this regenerator, the rest of the acid compounds absorbed by the solvent, notably $H_2S$, is vaporized by stripping effect with steam generated by reboiler 27 at the regenerator bottom. These gases are collected through line 22 at the regenerator top, cooled in exchanger 23, and the majority of the water and of the solvent contained in the regenerator top gas is condensed, separated in reflux drum 24 and recycled as reflux to the regenerator top through line 26. The operating temperature and pressure conditions of the regenerator depend on the type of solvent used. Regenerator 21 operates at a pressure generally ranging between the atmospheric pressure and 10 bara, preferably between 1.5 and 3 bara. The temperature at the bottom of the regenerator generally ranges between 100° C. and 200° C, preferably between 110° C. and 150° C.

At the bottom of regenerator 21, a stream of hot regenerated solvent is obtained through line 28 and recycled at least partly via pump 29 and line 30 to the top of absorber 2 after heat exchange with the $H_2S$-rich solvent in exchanger 9. Another part of the regenerated solvent is sent through line 31 to the top of absorber 15. The distribution of the regenerated solvent between absorber 2 and absorber 15 can be determined by the maximum proportion of $H_2S$ desired in the treated gas coming from line 3.

The gases released by partial vaporization in drum 12 are preferably cooled in exchanger 13 prior to being fed through line 14 into an absorber 15 to be contacted with a fraction of the regenerated solvent that is injected through line 31 at the top of absorber 15. The liquid fraction obtained after cooling in 13 can be fed into reflux drum 24. In absorber 15, the most part of the $H_2S$ contained in the gas from drum 12 is re-absorbed by the solvent. A gas that can be incinerated is obtained on the one hand at the top of this absorber 15 through line 16 and an $H_2S$-rich solvent that can be mixed with the solvent obtained at the bottom of drum 12 is obtained on the other hand at the bottom of absorber 15 through line 17. According to the composition of this solvent, it may also be advantageous to recycle it after pumping to absorber 2.

In the third embodiment of the invention described in connection with FIGS. 3 and 3b, the gas to be treated flows through line 1 into the bottom of an absorber 2. The gas from which the $H_2S$ absorbed by the solvent injected at the absorber top through lines 29 and/or 33 and the fractions of the co-absorbed compounds, notably the hydrocarbons and the $CO_2$, are extracted is recovered at the top of absorber 2. This absorber generally operates at temperatures close to or slightly higher than the ambient temperature, typically ranging between 20° C. and 100° C., preferably between 30° C. and 90° C., and at pressures typically ranging between 10 and 200 bar, preferably between 20 and 100 bar.

The $H_2S$-rich solvent obtained at the bottom of the absorber through line 4 is expanded by an expansion means 5 and fed into a first flash drum 6. This first expansion stage is optional for implementing the method according to the invention, but it allows to obtain, through line 7, a gas containing the major part of the aliphatic hydrocarbons co-absorbed by the solvent. This gas is possibly washed by a fraction of the regenerated solvent and the gas thus obtained can be used as fuel gas. This washing procedure, which is optional, is not shown here. Flash drum 6 operates at a pressure that is lower than that of absorber 2 and higher than that of flash drum 12. This pressure generally depends on the conditions of use of the fuel gas and it is typically of the order of 5 to 15 bara. This drum operates at a temperature that is substantially identical to that of the solvent obtained at the bottom of absorber 2.

The $H_2S$-rich solvent obtained after expansion is sent through line 8 to a preheating means. FIGS. 3 and 3b show a heat exchanger 9 with the regenerated solvent obtained at the bottom of regeneration column 15, but any other suitable preheating means can be used, provided that it allows the temperature of the $H_2S$-rich solvent to be brought to the level required for partial vaporization of the compounds absorbed by the $H_2S$-rich solvent.

The preheated $H_2S$-rich solvent is fed through line 11, after possible expansion by means of an expansion means 10, into drum 12 where the vaporized gases and the $H_2S$-rich solvent are separated. This drum 12 is operated under such temperature and pressure conditions that vaporization of a minor fraction of the $H_2S$ absorbed by the solvent, generally below 35%, preferably below 30%, and of a major fraction of the aromatic hydrocarbons absorbed by the solvent, above 50%, preferably above 70%, is obtained. The pressure of drum 12 is lower than that of drum 6 and higher than that of absorber 25, preferably ranging between 1.5 and 6 bara. The temperature of drum 12 ranges between that of the $H_2S$-laden solvent obtained at the bottom of absorber 2 and that of the regenerated solvent obtained at the bottom of regenerator 15.

It is possible to recycle a minor fraction of the acid gas obtained at the top of reflux drum 18 or to use any other gas stream that would be available as stripping agent, injected into the bottom of drum 12, so as to increase the proportion of aromatic hydrocarbons vaporized during this stage. Besides, alternatively or as a complement to the acid gas recycle, it is also possible to recycle a fraction of hot regenerated absorbent solution obtained at the bottom of regenerator 15 to the top of drum 12 so as to wash the vaporized gases and thus to concentrate the hydrogen sulfide in the absorbent solution sent to regeneration column 15.

Figure 3:
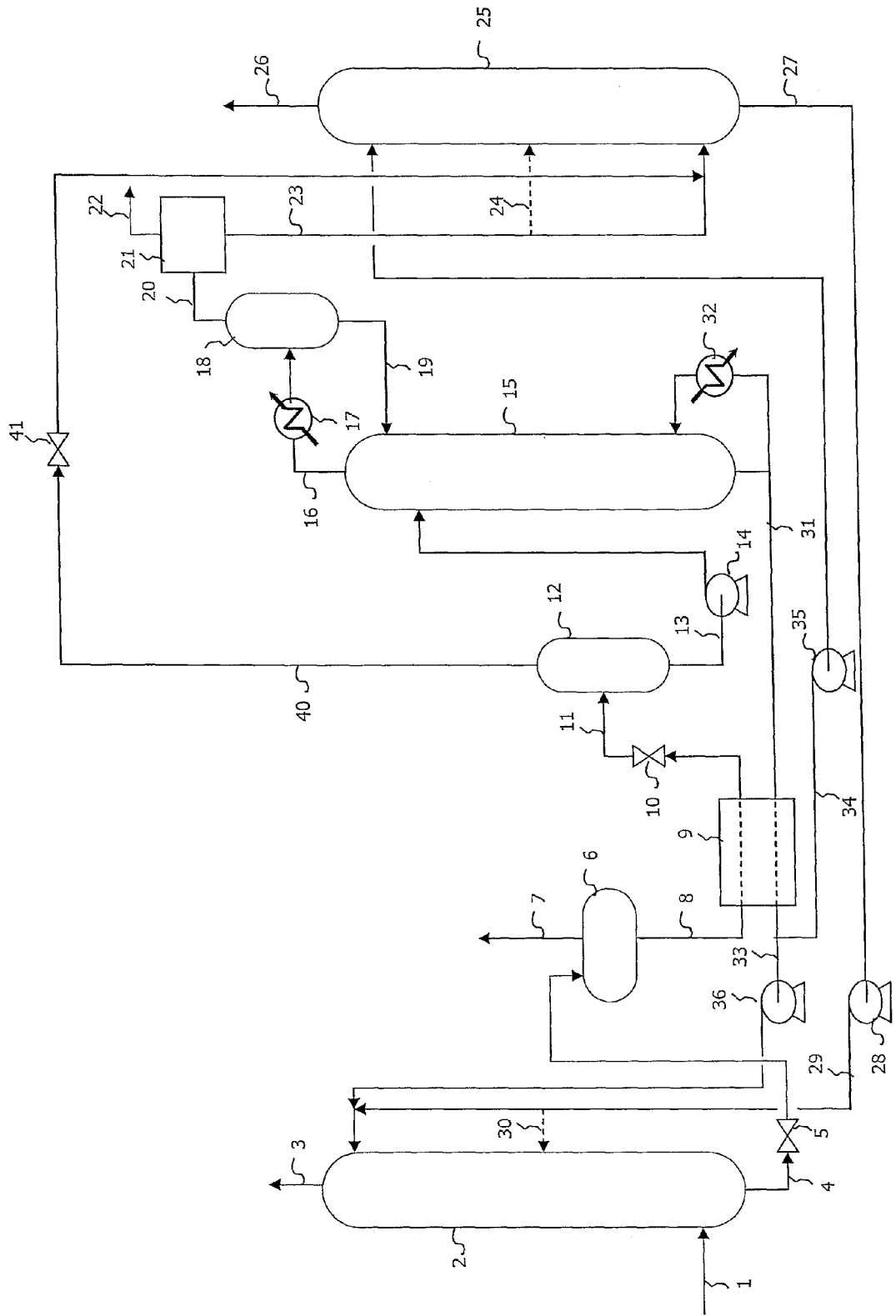
Figure 3B:
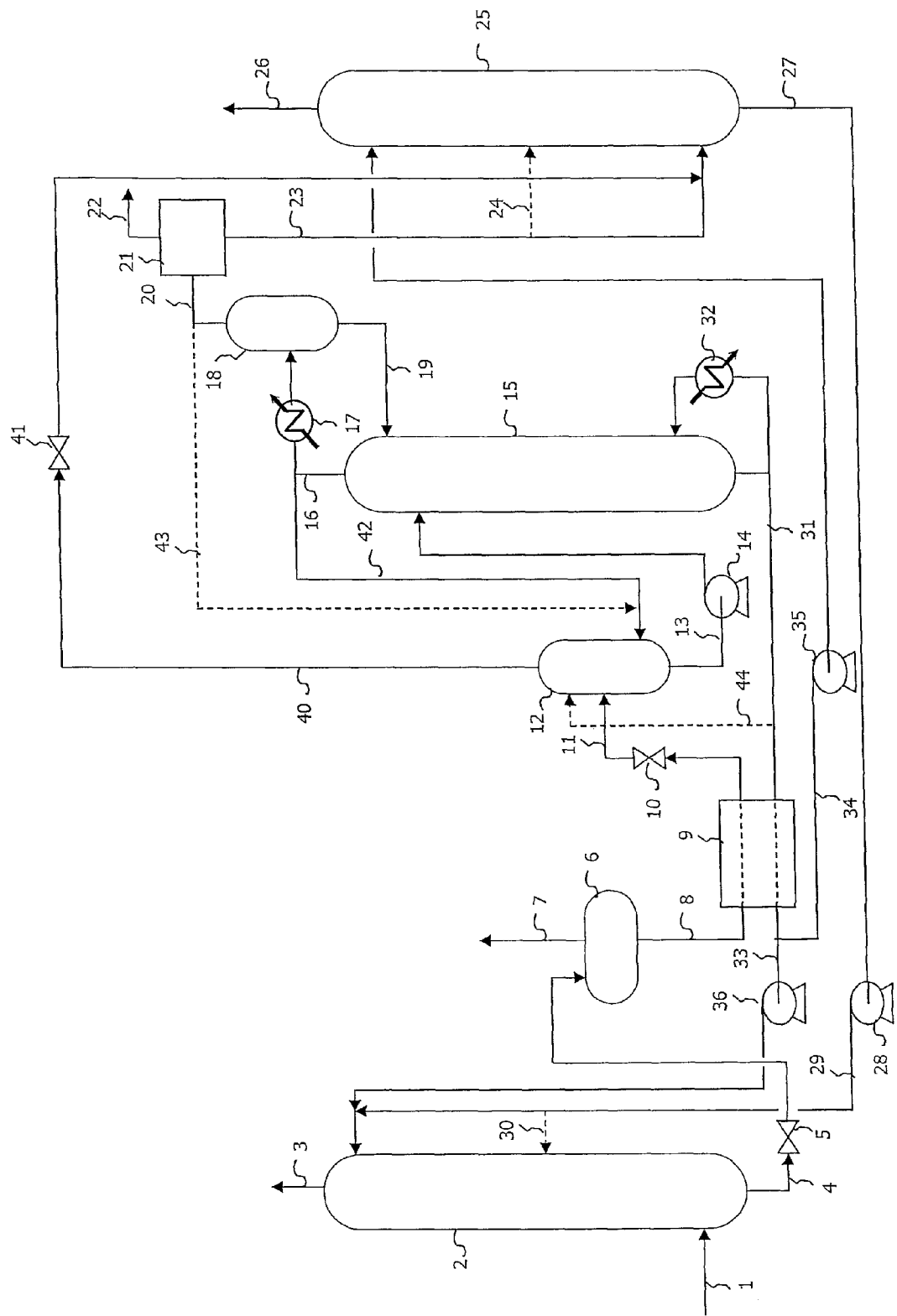

FIG. 3b completes the method described in reference to FIG. 3 by diagrammatically showing two embodiments of the recycle of the acid gas obtained in regenerator 15 to drum 12 and an embodiment of the recycle of the hot regenerated absorbent solution obtained at the bottom of regenerator 15 to drum 12.

In FIG. 3b, a fraction of the acid gas obtained directly at the outlet of regenerator 15 through line 42 or obtained at the top of reflux drum 18 through line 43 is injected into the bottom of drum 12. This recycling of a fraction of the acid gas, ranging between 0 and 80% by volume of the total stream, preferably between 0 and 50% and more preferably between 10 and 35% of the total stream, allows to increase the proportion of aromatic hydrocarbons vaporized during this stage and to enrich in $H_2S$ said acid gas from regenerator 15, and therefore to improve the operation of unit 21 intended for conversion of the $H_2S$ to sulfur by means of the Claus process. This $H_2S$ enrichment of the acid gas at the outlet of regenerator 15 is explained by the amount of $CO_2$ discharged through line 40 that is notably improved, which causes an increase of concentration of the residual $H_2S$ in the solvent obtained at the bottom of drum 12 and sent through line 13 and pump 14 to the top of regenerator 15, and therefore an increase of concentration of the $H_2S$ in the acid gas released at the top of regenerator 15 through line 20.

In FIG. 3b, a fraction of hot regenerated absorbent solution obtained at the bottom of regenerator 15 through line 31 is injected via line 44 to the top of drum 12. In drum 12, the hot regenerated absorbent solution is contacted with the gas released by the expansion of the acid compound-laden absorbent solution flowing in through line 11 and possibly with the stripping gases fed into 12 through line 42 and/or 43. This recycling of a fraction of hot regenerated absorbent solution ranging between 0 and 50% by volume of the total stream, preferably between 5 and 35% by volume of the total stream, allows to wash, without any additional equipment, the gaseous fraction from drum 12 and thus to deplete this gaseous fraction in hydrogen sulfide, therefore to enrich the absorbent solution in hydrogen sulfide. The absorbent solution thus enriched in hydrogen sulfide allows to produce an acid gas that is accordingly richer at the outlet of regenerator 15.

In connection with FIGS. 3 and 3b, the solvent obtained at the bottom of drum 12 is sent through line 13 and pump 14 to the top of regenerator 15. In this regenerator, the acid compounds absorbed by the solvent, notably $H_2S$, are vaporized by stripping effect with steam generated by reboiler 32 at the regenerator bottom. These gases are collected through line 16 at the regenerator top, cooled in exchanger 17, and the majority of the water and of the solvent contained in the regenerator top gas is condensed, separated in reflux drum 18 and recycled as reflux to the regenerator top through line 19. The operating temperature and pressure conditions of the regenerator depend on the type of solvent used. Regenerator 15 operates at a pressure generally ranging between the atmospheric pressure and 10 bara, preferably between 1.5 and 3 bara. The temperature at the bottom of the regenerator generally ranges between 100° C. and 200° C., preferably between 110° C. and 150° C.

At the bottom of regenerator 15, a stream of hot regenerated solvent is obtained through line 31 and recycled at least partly via line 33 and pump 36 to the top of absorber 2 after heat exchange with the $H_2S$-rich solvent in exchanger 9. Another part of the regenerated solvent can be sent through line 34 and pump 35 to the top of absorber 25. The distribution of the regenerated solvent between absorber 2 and absorber 25 can be determined according to the maximum proportion of $H_2S$ desired in the treated gas coming from absorber 2 through line 3.

The acid gas obtained at the top of reflux drum 18 through line 20 is treated in plant 21 intended for conversion of the $H_2S$ to sulfur by means of the Claus process. This plant produces liquid elementary sulfur through line 22. It comprises a stage of treating the residue gases obtained at the outlet of the Claus catalytic stage by catalytic reduction to $H_2S$ of the sulfur compounds and cooling. The residue gas, commonly referred to as Claus tail gas, thus obtained through line 23 is sent to the bottom of absorber 25, where the $H_2S$ present in this gas will be absorbed by a fraction of the cooled regenerated solvent, injected via line 34 and pump 35 at the top of absorber 25. Operation of Claus plant 21 is improved because the proportion of aromatic compounds in the acid gas obtained after regeneration is decreased by means of the separation carried out in drum 12. Furthermore, in cases where the expansion in drum 12 allows to vaporize a substantial amount of $CO_2$ contained in the solvent, the acid gas coming from the regeneration stage through line 20 is concentrated in $H_2S$. This increase in the $H_2S$ concentration contributes to improving the operation of Claus plant 21.

The gases released by partial vaporization in drum 12 are collected through line 40 and, possibly after expansion through means 41, they are also fed to the bottom of absorber 25 where the $H_2S$ they contain will be re-absorbed. These gases can possibly, but not necessarily, also be cooled and condensed prior to being sent to absorber 25. Such an option is not shown here.

The residue gas from sulfur recovery plant 21 possibly containing a lower proportion of $H_2S$ than the gas coming from drum 12 can also be optionally fed into absorber 25 at a higher level than the injection level of the gas coming from drum 12 through line 24.

A solvent partly laden with $H_2S$ is obtained at the bottom of residue gas absorber 25, which can be either sent back directly to regenerator 15 after heat exchange with a fraction of the regenerated solvent obtained at the bottom of regenerator 15, or, as shown in FIG. 3, sent back to absorber 2 via pump 28 so as to benefit from the residual $H_2S$ absorption capacity of this partly laden solvent. This solvent can be sent totally or partly to the top of absorber 2, in admixture with the regenerated solvent, via line 29, or totally or partly to a lower level of absorber 2 via line 30.

The numerical examples given hereafter illustrate the operation and the advantages of the method according to the invention. The first example is given by way of comparison and illustrates a method according to the prior art. Examples 2 and 3 illustrate the mode of operation of the method according to embodiments 3 and 1 of the invention. Examples 4 and 5 allow to compare the mode of operation of the methods described in reference to FIGS. 3 and 3b.

EXAMPLE 1

Comparative, According to the Prior Art

A natural gas whose composition is given in Table 1 is treated in an absorption column.

TABLE 1

| Constituents | Concentration |
| --- | --- |
| hydrogen sulfide | 3.5% mol |
| carbon dioxide | 4.5% mol |
| nitrogen | 1% mol |
| methane | 84.5% mol |
| ethane | 3% mol |
| C3 + (propane + other heavier hydrocarbons) | 3.35% mol |
| aromatic hydrocarbons (benzene, toluene and xylenes) | 1500 ppmv |

The gas is at a temperature of 40° C. and it flows into an absorption column at a pressure of 60 bar, at a flow rate of 472 kNm$^3$/h.

The solvent used is methyldiethanolamine diluted to 50% weight in water. The solvent flows into the absorption column at a temperature of 50° C. and at a flow rate of 600 m$^3$/h.

The natural gas, after being treated, leaves the absorption column at a flow rate of 441 kNm$^3$/h with the composition given in Table 2.

TABLE 2

| Constituents | Concentration |
| --- | --- |
| hydrogen sulfide | 4 ppmv |
| carbon dioxide | 1.65% mol |
| nitrogen | 1.1% mol |
| methane | 90% mol |
| ethane | 3.2% mol |
| C3 + (propane + other heavier hydrocarbons) | 3.6% mol |
| aromatic hydrocarbons (benzene, toluene and xylenes) | 1460 ppmv |

The amine solution enriched in acid compounds (hydrogen sulfide and carbon dioxide) flows from the absorption column and undergoes, in a drum, an expansion allowing to remove part of the acid compounds and of the hydrocarbons absorbed. The amine solution leaves the flash drum and is directly sent to the regeneration column.

The acid gas from the regeneration column has the composition given in Table 3.

TABLE 3

| Constituents | Concentration |
| --- | --- |
| hydrogen sulfide | 51.4% mol |
| carbon dioxide | 43.2% mol |
| water | 5% mol |
| methane | 0.2% mol |
| ethane + other heavier hydrocarbons | 0.02% mol |
| aromatic hydrocarbons (benzene, toluene and xylenes) | 1743 ppmv |

This acid gas, that constitutes the Claus inlet feed, at a flow rate of 30.4 kNm$^3$/h, comprises an aromatics content of 1743 ppmv and a low H$_2$S content of 51.4% mol, and, even preheated to 220° C., like the air injected, it does not allow to reach a temperature likely to reduce the aromatics content at the oven outlet to below 300 ppmv. The high aromatic hydrocarbon residual content leads to deactivation of the catalysts of the first Claus catalytic stage.

EXAMPLE 2

According to the Invention

Example 2 illustrates the mode of operation of the method described in reference to FIG. 3.

The same natural gas, with the same composition as in Example 1 (see Table 1), is treated in absorption column 2 under the same operating conditions as in Example 1.

After a first expansion in flash drum 6, the amine solution leaves flash drum 6 through line 8, flows through exchanger 9, and is subjected to a second expansion in drum 12 at 2.7 bar and 104.3° C. Expansion, that allows part of the CO$_2$ and the major part of the aromatic hydrocarbons to be removed, releases a flash gas that leaves the drum through line 40. This flash gas has the composition described in Table 4.

TABLE 4

| Constituents | Concentration |
| --- | --- |
| hydrogen sulfide | 23.1% mol |
| carbon dioxide | 38.2% mol |
| water | 38.1% mol |
| methane | 0.3% mol |
| ethane + other heavier hydrocarbons | 0.03% mol |
| aromatic hydrocarbons (benzene, toluene and xylenes) | 2612 ppmv |

This flash gas is then sent at a flow rate of 19.0 kNm$^3$/h to second absorption column 25 through line 40 and it is treated with the gases coming from (Claus) section 21 according to the mode of operation described in reference to FIG. 3.

The amine solution leaves drum 12 through line 13 and it is sent to regeneration column 15.

After regeneration, the amine solution leaves regeneration column 15 through line 31 prior to entering, after flowing through exchanger 9, absorption columns 2 and 25 through lines 33 and 34.

The acid gas from regeneration column 15 has the composition given in Table 5.

TABLE 5

| Constituents | Concentration |
| --- | --- |
| hydrogen sulfide | 62.4% mol |
| carbon dioxide | 32.6% mol |
| water | 5% mol |
| aromatic hydrocarbons (benzene, toluene and xylenes) | 188 ppmv |

This acid gas is sent through line 20 to (Claus) section 21 at a flow rate of 18.0 kNm$^3$/h. This acid gas, that eventually contains only 188 ppmv aromatic hydrocarbons, versus 1743 ppmv in the acid gas of Example 1 according to the prior art, and that comprises 62.4% mol hydrogen sulfide, versus only 51.4% mol in the acid gas of Example 1 according to the prior art, is preheated to 220° C. like the air injected. The temperature reached in the oven is higher than that of Example 1 and therefore sufficient to reduce the residual aromatic hydrocarbon content at the oven outlet to less than 25 ppmv. The Claus catalyst of the first catalytic stage will therefore have a longer life and activity.

EXAMPLE 3

According to the Invention

Example 3 illustrates the mode of operation of the method described in reference to FIG. 1.

The same natural gas, with the same composition as in Example 1 (see Table 1), is treated in absorption column 2 according to the same operating conditions as in Example 1.

After a first expansion in flash drum 6, the amine solution leaves flash drum 6 through line 8, flows through exchanger 9, and is subjected to a second expansion in drum 12. Expansion, that allows part of the carbon dioxide and the major part of the aromatic hydrocarbons to be removed, releases a flash gas that leaves the drum through line 13. This flash is carried out under the same conditions as in Example 2 and the flash gas has the same composition as in Example 2, given in Table 4.

The amine solution leaves drum 12 through line 15 and it enters regeneration column 18.

After regeneration, the amine solution leaves regeneration column 18 through line 27 and it enters absorption column 2 through line 30 after flowing through exchanger 9.

The acid gas from regeneration column 18 has the same composition as in Example 2, given in Table 5.

The flash gas from drum 12 is sent to a condenser 40 through line 13 in order to lower the water content. The composition of the flash gas obtained after condensation is given in Table 6.

TABLE 6

| Constituents | Concentration |
| --- | --- |
| hydrogen sulfide | 35.6% mol |
| carbon dioxide | 58.9% mol |
| water | 4.6% mol |
| methane | 0.5% mol |
| ethane + other heavier hydrocarbons | 0.04% mol |
| aromatics (benzene, toluene and xylenes) | 4028 ppmv |

This $H_2S$-poor and aromatics-rich flash gas is sent at a flow rate of 12.3 kNm$^3$/h, through line 13, after condensation, to section 32, i.e. to the first zone of the Claus plant oven. A fraction of the $H_2S$-rich acid gas from regeneration column 18 is sent through line 25 to section 32, i.e. the first zone of the Claus plant oven, and the major part of this acid gas is sent through line 41 to section 33, i.e. the second zone of the Claus plant oven.

The flash gas mixed with a fraction of the $H_2S$-rich acid gas is preheated to 220° C., as well as the air also preheated to this temperature: they are sent to the first zone of the oven through the burner, which allows to reach a temperature higher by about 250° C. in comparison to the temperature reached in Example 1 according to the prior art, thus sufficient to reduce the aromatics content at the oven outlet to less than 30 ppmv. The Claus catalyst of the first catalytic stage will therefore have a longer life and activity.

The fact that the acid gas obtained in Examples 2 and 3 (see Table 5) is, on the one hand, more concentrated in $H_2S$ and, on the other hand, poorer in $CO_2$ and in aromatic hydrocarbons, than the acid gas obtained in Example 1 (see Table 3) clearly shows the significance of carrying out an expansion, under the conditions according to the invention, of the solvent in drum 12 prior to regeneration.

EXAMPLE 4

According to the Invention

Example 4 illustrates the mode of operation of the method described in reference to FIG. 3.

The same natural gas with the same composition as in Example 1 (see Table 1) is treated in absorption column 2 under the same operating conditions as in Example 1.

After a first expansion in flash drum 6, the amine solution leaves flash drum 6 through line 8, flows through exchanger 9, and is subjected to a second expansion in drum 12 at 2.0 bar and 100.1° C. Expansion, that allows part of the $CO_2$ and the major part of the aromatic hydrocarbons to be removed, releases a flash gas that leaves the drum through line 40. This flash gas has the composition described in Table 7.

TABLE 7

| Constituents | Concentration |
| --- | --- |
| hydrogen sulfide | 22.2% mol |
| carbon dioxide | 33.0% mol |
| water | 44.3% mol |
| methane | 0.2% mol |
| ethane + other heavier hydrocarbons | 0.02% mol |
| aromatic hydrocarbons (benzene, toluene and xylenes) | 2103 ppmv |

This flash gas is then sent at a flow rate of 24.2 kNm$^3$/h to second absorption column 25 through line 40 and it is treated with the gases coming from (Claus) section 21 according to the mode of operation described in reference to FIG. 3.

The amine solution leaves drum 12 through line 13 and it is sent to regeneration column 15.

After regeneration, the amine solution leaves regeneration column 15 through line 31 prior to entering, after flowing through exchanger 9, absorption columns 2 and 25 through lines 33 and 34.

The acid gas coming from regeneration column 15 through line 20 has the composition given in Table 8.

TABLE 8

| Constituents | Concentration |
| --- | --- |
| hydrogen sulfide | 63.3% mol |
| carbon dioxide | 31.7% mol |
| water | 5% mol |
| aromatic hydrocarbons (benzene, toluene and xylenes) | 132 ppmv |

This acid gas is sent through line 20 to (Claus) section 21 at a flow rate of 16.2 kNm$^3$/h. This acid gas, that eventually contains only 132 ppmv aromatic hydrocarbons, versus 1743 ppmv in the acid gas of Example 1 according to the prior art, and that comprises 63.3% mol hydrogen sulfide, versus only 51.4% mol in the acid gas of Example 1 according to the prior art, is preheated to 220° C. like the air injected. The temperature reached in the oven is higher than that of Example 1 and therefore sufficient to reduce the residual aromatic hydrocarbon content at the oven outlet to less than 25 ppmv. The Claus catalyst of the first catalytic stage will therefore have a longer life and activity.

EXAMPLE 5

According to the Invention

Example 5 illustrates the mode of operation of the method described in reference to FIG. 3b, with recycling of a fraction of the acid gas from the outlet of regenerator 15 through line 42 to drum 12.

The same natural gas with the same composition as in Example 1 (see Table 1) is treated in absorption column 2 under the same operating conditions as in Example 1.

After a first expansion in flash drum 6, the amine solution leaves flash drum 6 through line 8, flows through exchanger 9, and is subjected to a second expansion in drum 12 at 2.0 bar and 100.1° C. Expansion, that allows part of the $CO_2$ and the major part of the aromatic hydrocarbons to be removed, releases a flash gas that leaves the drum through line 40. This flash is favoured by recycling of 20% of the acid gas stream leaving regenerator 15 through line 42 at 2.35 bar and 114.1° C. and at a flow rate of 9.9 kNm³/h. The gas recycled through line 42 has the composition described in Table 9. The flash gas leaving drum 12 through line 40 has the composition described in Table 10.

TABLE 9

| Constituents | Concentration |
|---|---|
| hydrogen sulfide | 22.1% mol |
| carbon dioxide | 8.1% mol |
| water | 69.8% mol |
| methane | 0.0% mol |
| ethane + other heavier hydrocarbons | 0.0% mol |
| aromatic hydrocarbons (benzene, toluene and xylenes) | 5 ppmv |

TABLE 10

| Constituents | Concentration |
|---|---|
| hydrogen sulfide | 22.5% mol |
| carbon dioxide | 32.6% mol |
| water | 44.5% mol |
| methane | 0.2% mol |
| ethane + other heavier hydrocarbons | 0.02% mol |
| aromatic hydrocarbons (benzene, toluene and xylenes) | 1738 ppmv |

This flash gas is then sent at a flow rate of 30.4 kNm³/h to second absorption column 25 through line 40 and it is treated with the gases coming from (Claus) section 21 according to the mode of operation described in reference to FIG. 3b.

The amine solution leaves drum 12 through line 13 and it is sent to regeneration column 15.

After regeneration, the amine solution leaves regeneration column 15 through line 31 prior to entering, after flowing through exchanger 9, absorption columns 2 and 25 through lines 33 and 34.

The acid gas coming from regeneration column 15 through line 20 has the composition given in Table 11.

TABLE 11

| Constituents | Concentration |
|---|---|
| hydrogen sulfide | 69.5% mol |
| carbon dioxide | 25.5% mol |
| water | 5% mol |
| aromatic hydrocarbons (benzene, toluene and xylenes) | 15 ppmv |

This acid gas is sent through line 20 to (Claus) section 21 at a flow rate of 12.6 kNm³/h. This acid gas, that eventually contains only 15 ppmv aromatic hydrocarbons, versus 132 ppmv in the acid gas of Example 4 according to the invention, and that comprises 69.5% mol hydrogen sulfide, versus 63.3% mol in the acid gas of Example 4 according to the invention, is preheated to 220° C. like the air injected. As a result of the $H_2S$ enrichment, the temperature reached in the oven is higher than that of Example 4 and it therefore allows to improve the reduction in the residual aromatic hydrocarbon content at the oven outlet. The Claus catalyst of the first catalytic stage will therefore have a longer life and activity. Furthermore, the flow rate of the gas to be treated is decreased from 16.2 to 12.6 kNm³/h and therefore leads to a 22% reduction in the size of the Claus plant and in the amount of catalyst required in this plant.

The invention claimed is:

1. A method of extracting the hydrogen sulfide contained in a gas comprising aromatic hydrocarbons, wherein the following stages are carried out:

a) contacting said gas with an absorbent solution so as to obtain a gas depleted in hydrogen sulfide and an absorbent solution laden with hydrogen sulfide, b) performing a first expansion of the hydrogen sulfide-laden absorbent solution obtained at stage a) so as to release a gaseous fraction containing aliphatic hydrocarbons, c) heating, then expanding the hydrogen sulfide-laden absorbent solution obtained after the first expansion performed at stage b) to a predetermined temperature and pressure so as to release a gaseous fraction comprising aromatic hydrocarbons and to obtain an absorbent solution depleted in aromatic hydrocarbons and enriched in carbon dioxide, said temperature and said pressure being so selected that said gaseous fraction comprises at least 50% of the aromatic hydrocarbons contained in said hydrogen sulfide-laden absorbent solution and at most 35% hydrogen sulfide contained in said hydrogen sulfide-laden absorbent solution, and d) thermally regenerating the absorbent solution depleted in aromatic hydrocarbon compounds so as to release a hydrogen sulfide-rich gaseous effluent and to obtain a regenerated absorbent solution.

2. A method as claimed in claim 1, wherein at least part of the regenerated absorbent solution obtained in stage d) is recycled to stage a) as absorbent solution.

3. A method as claimed in claim 1, wherein at least part of the hydrogen sulfide-rich gaseous effluent obtained in stage d) is treated by a Claus process.

4. A method as claimed in claim 3, wherein the gaseous fraction comprising aromatic hydrocarbons obtained in stage c) is sent to a burner of said Claus process.

5. A method of extracting the hydrogen sulfide contained in a gas comprising aromatic hydrocarbons, wherein the following stages are carried out:

a) contacting said gas with an absorbent solution so as to obtain a gas depleted in hydrogen sulfide and an absorbent solution laden with hydrogen sulfide, b) heating and expanding the hydrogen sulfide-laden absorbent solution to a predetermined temperature and pressure so as to release a gaseous fraction comprising aromatic hydrocarbons and to obtain an absorbent solution depleted in aromatic hydrocarbons and enriched in carbon dioxide, said temperature and said pressure being so selected that said gaseous fraction comprises at least 50% of the aromatic hydrocarbons contained in said hydrogen sulfide-laden absorbent solution and at most 35% hydrogen sulfide contained in said hydrogen sulfide-laden absorbent solution, c) thermally regenerating the absorbent solution depleted in aromatic hydrocarbon compounds so as to release a hydrogen sulfide-rich gaseous effluent and to obtain a regenerated absorbent solution, d) treating at least part of the hydrogen sulfide-rich gaseous effluent obtained in stage c) by a Claus process, and e) contacting the gaseous fraction comprising aromatic hydrocarbons obtained in stage b), as well as tail gases from said Claus process of stage d), with a second absorbent solution so as to produce a hydrogen sulfide-poor stream and a second absorbent solution enriched in hydrogen sulfide.

6. A method as claimed in claim 5, wherein at least part of the second hydrogen sulfide-enriched absorbent solution is recycled to stage a) as absorbent solution.

7. A method as claimed in claim 5, wherein stage c) is carried out in a regeneration column and wherein at least part of the second hydrogen sulfide-enriched absorbent solution is fed into said column so as to be regenerated.

8. A method as claimed in claim 1, wherein the gaseous fraction comprising aromatic hydrocarbons obtained in stage c) is contacted with a portion of the regenerated absorbent solution obtained in stage d) so as to obtain a gaseous fraction depleted in hydrogen sulfide and a third absorbent solution enriched in hydrogen sulfide.

9. A method as claimed in claim 8, wherein the gaseous fraction comprising aromatic hydrocarbons obtained in stage c) is first cooled and condensed prior to being contacted with the portion of the regenerated absorbent solution obtained in stage d).

10. A method as claimed in claim 8, wherein the hydrogen sulfide-rich gaseous effluent obtained in stage d) is treated by means of a hydrogen sulfide oxidation process.

11. A method of extracting the hydrogen sulfide contained in a gas comprising aromatic hydrocarbons, wherein the following stages are carried out:

a) contacting said gas with an absorbent solution so as to obtain a gas depleted in hydrogen sulfide and an absorbent solution laden with hydrogen sulfide, b) heating and expanding the hydrogen sulfide-laden absorbent solution to a predetermined temperature and pressure so as to release a gaseous fraction comprising aromatic hydrocarbons and to obtain an absorbent solution depleted in aromatic hydrocarbons and enriched in carbon dioxide, said temperature and said pressure being so selected that said gaseous fraction comprises at least 50% of the aromatic hydrocarbons contained in said hydrogen sulfide-laden absorbent solution and at most 35% hydrogen sulfide contained in said hydrogen sulfide-laden absorbent solution, and c) thermally regenerating the absorbent solution depleted in aromatic hydrocarbon compounds so as to release a hydrogen sulfide-rich gaseous effluent and to obtain a regenerated absorbent solution, wherein, prior to stage c), the absorbent solution depleted in aromatic hydrocarbons is contacted with a fraction of the hydrogen sulfide-rich gaseous effluent obtained in stage c) so that said fraction carries along part of the aromatic hydrocarbons contained in said solution.

12. A method of extracting the hydrogen sulfide contained in a gas comprising aromatic hydrocarbons, wherein the following stages are carried out:

a) contacting said gas with an absorbent solution so as to obtain a gas depleted in hydrogen sulfide and an absorbent solution laden with hydrogen sulfide, b) heating and expanding the hydrogen sulfide-laden absorbent solution to a predetermined temperature and pressure so as to release a gaseous fraction comprising aromatic hydrocarbons and to obtain an absorbent solution depleted in aromatic hydrocarbons and enriched in carbon dioxide, said temperature and said pressure being so selected that said gaseous fraction comprises at least 50% of the aromatic hydrocarbons contained in said hydrogen sulfide-laden absorbent solution and at most 35% hydrogen sulfide contained in said hydrogen sulfide-laden absorbent solution, and c) thermally regenerating the absorbent solution depleted in aromatic hydrocarbon compounds so as to release a hydrogen sulfide-rich gaseous effluent and to obtain a regenerated absorbent solution, wherein the hydrogen sulfide-rich gaseous effluent obtained in stage c) is partly condensed by cooling so as to produce a gas phase and a condensate and wherein, prior to stage c), the absorbent solution depleted in aromatic hydrocarbons is contacted with a fraction of said gas phase so that said fraction carries along part of the aromatic hydrocarbons and of the carbon dioxide contained in said solution.

13. A method as claimed in any claim 1, wherein the gaseous fraction released in stage c) is directly contacted with part of the regenerated absorbent solution obtained in stage d).

14. A method as claimed in claim 1, wherein the absorbent solution comprises an amine in solution in water.

15. A method as claimed in claim 14, wherein the amine is selected from among the group comprising methyldiethanolamine, diisopropanolamine and the sterically encumbered amines, and wherein, in stage c), said temperature ranges between 80° C. and 140° C., and said pressure ranges between 1.5 and 6 bara.

16. A method as claimed in claim 14, wherein the amine is selected from among the group comprising monoethanolamine and diethanolamine, and wherein, in stage c), said temperature ranges between 80° C. and 140° C., and said pressure ranges between 1.5 and 6 bara.

17. A method as claimed in claim 1, wherein the absorbent solution is selected from among the group made up of sulfolane, methanol, N-formyl morpholine, acetyl morpholine, propylene carbonate, dimethyl ether polyethylene glycol or N-methyl pyrrolidone.

18. A method as claimed in claim 1, wherein the gas is a natural gas.

19. A method as claimed in claim 1, wherein the gas comprises at least 50 ppmv aromatic hydrocarbons.

20. A method as claimed in claim 3, wherein the gaseous fraction comprising aromatic hydrocarbons obtained in stage c), as well as tail gases from said Claus process, are contacted with a second absorbent solution so as to produce a hydrogen sulfide-poor stream and a second absorbent solution enriched in hydrogen sulfide.

21. A method as claimed in claim 1, wherein, prior to stage d), the absorbent solution depleted in aromatic hydrocarbons is contacted with a fraction of the hydrogen sulfide-rich gaseous effluent obtained in stage d) so that said fraction carries along part of the aromatic hydrocarbons contained in said solution.

22. A method as claimed in claim 1, wherein the hydrogen sulfide-rich gaseous effluent obtained in stage d) is partly condensed by cooling so as to produce a gas phase and a condensate and wherein, prior to stage d), the absorbent solution depleted in aromatic hydrocarbons is contacted with a fraction of said gas phase so that said fraction carries along part of the aromatic hydrocarbons and of the carbon dioxide contained in said solution.

* * * * *